(12) United States Patent
Kratochvil et al.

(10) Patent No.: US 9,995,452 B2
(45) Date of Patent: Jun. 12, 2018

(54) LIGHT DEVICE, ESPECIALLY A HEADLIGHT FOR MOTOR VEHICLES

(71) Applicant: Varroc Lighting Systems, s.r.o., Senov u Noveho Jicina (CZ)

(72) Inventors: Jan Kratochvil, Horka-Domky (CZ); Dana Pekarkova, Valasske Mezirici (CZ); Ondrej Hasa, Ratibor (CZ); Jan Grof, Libhost (CZ); Milos Macicek, Nový Jicin (CZ); Zdenek Mikeska, Borsice u Blatnice (CZ); Milan Kytka, Dolny Kubin (SK); Radek Orlita, Nový Jicin (CZ); Tomas David, Zasova (CZ); David Hynar, Morkov (CZ)

(73) Assignee: Varroc Lighting Systems, s.r.o. (CZ)

( * ) Notice: Subject to any disclaimer, the term of this patent is extended or adjusted under 35 U.S.C. 154(b) by 109 days.

(21) Appl. No.: 15/041,809

(22) Filed: Feb. 11, 2016

(65) Prior Publication Data

US 2016/0230948 A1   Aug. 11, 2016

(30) Foreign Application Priority Data

Feb. 11, 2015   (CS) ........................................ 2015-92

(51) Int. Cl.
*B60Q 1/04* (2006.01)
*F21V 11/08* (2006.01)
*F21S 8/10* (2006.01)

(52) U.S. Cl.
CPC .......... *F21S 48/125* (2013.01); *F21S 41/147* (2018.01); *F21S 41/24* (2018.01); *F21S 41/25* (2018.01);
(Continued)

(58) Field of Classification Search
CPC ... F21S 48/14–48/147; F21S 48/125–48/1291;
(Continued)

(56) References Cited

U.S. PATENT DOCUMENTS

| | | | |
|---|---|---|---|
| 2002/0034081 A1 | 3/2002 | Serizawa | |
| 2003/0189840 A1* | 10/2003 | Matsumoto | F21S 48/1358 362/539 |

(Continued)

FOREIGN PATENT DOCUMENTS

| | | |
|---|---|---|
| AT | 512864 B1 | 11/2013 |
| DE | 102004014900 A1 | 6/2005 |

(Continued)

OTHER PUBLICATIONS

Search Report from Corresponding Czech Application PV 2015-92 dated Oct. 20, 2015 (3 pages).

*Primary Examiner* — Mariceli Santiago
(74) *Attorney, Agent, or Firm* — Hovey Williams LLP; Joan Optican Herman

(57) ABSTRACT

A light device, especially a headlight of motor vehicles, comprises at least one light unit (1), or a group (1a, 1b) of light units, at least one optical directing element (3, 2e, 3f), adapted to direct the light beam emitted by the light unit, or group of light units, to the required direction, and at least one output lens (4) for passage of at least a part of the light rays of the light beam or beams to create a light pattern (A, B, C) on the display surface (ZY). On the route of the light beam between the optical directing element and the output lens, there is at least one optical diaphragm element (11, 21, 31) containing a system of trim edges (13, 23, 33) to create the required shape of the cross-section of a part or parts of the light beam designed for transmission along the above-mentioned route.

15 Claims, 17 Drawing Sheets

(52) U.S. Cl.
CPC ........... *F21S 41/265* (2018.01); *F21S 41/285* (2018.01); *F21S 41/321* (2018.01); *F21S 41/43* (2018.01)

(58) Field of Classification Search
CPC ... F21S 48/1763–48/1794; F21S 41/40–41/47; F21S 41/68–41/698; F21V 11/08–11/14
See application file for complete search history.

(56) References Cited

U.S. PATENT DOCUMENTS

| | | | |
|---|---|---|---|
| 2005/0225999 A1* | 10/2005 | Bucher | F21S 48/145 362/539 |
| 2008/0285297 A1* | 11/2008 | Ishida | F21S 48/1154 362/539 |
| 2009/0034278 A1 | 2/2009 | Tessnow et al. | |
| 2010/0226144 A1* | 9/2010 | Stade | F21S 48/1154 362/520 |
| 2011/0267455 A1 | 11/2011 | Gotz et al. | |
| 2012/0287660 A1* | 11/2012 | Murakawa | F21S 48/145 362/520 |
| 2013/0021810 A1 | 1/2013 | Funk et al. | |
| 2014/0063833 A1* | 3/2014 | Park | F21S 48/1154 362/520 |
| 2014/0204602 A1* | 7/2014 | Jungwirth | F21S 48/1154 362/521 |
| 2015/0285456 A1 | 10/2015 | Moser et al. | |

FOREIGN PATENT DOCUMENTS

| | | |
|---|---|---|
| FR | 2897672 A1 | 8/2007 |
| JP | 2010036835 A | 2/2010 |
| JP | 2013252821 A | 12/2013 |

\* cited by examiner

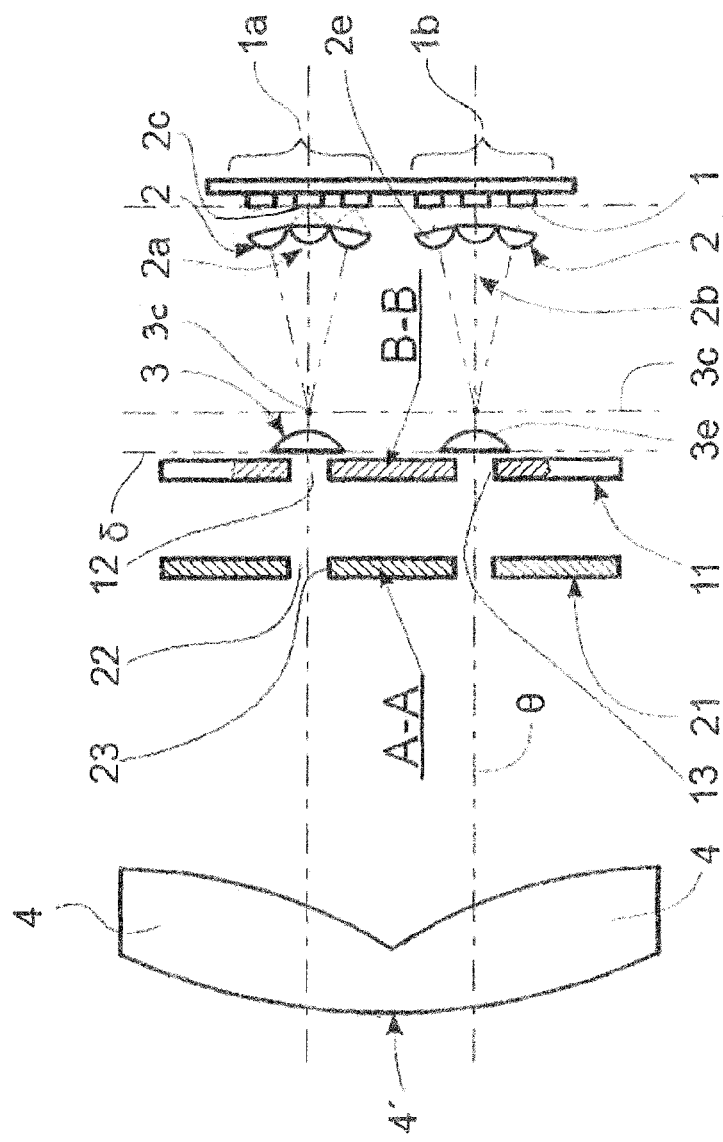

LIGHT DEVICE, ESPECIALLY A HEADLIGHT FOR MOTOR VEHICLES

FIELD OF THE INVENTION

The invention relates to a light device, especially an adaptive headlight for motor devices, and it relates to a light device containing a light-emitting optical system that contains controllable projection equipment to achieve the required emitting characteristic of the output light trace, while the light intensity can be variably changed in specific zones of the light trace.

BACKGROUND INFORMATION

A headlight, especially for motor vehicles, contains at least one optical system comprising a powerful light source and optical elements. The light source emits light rays and the optical elements represent a system of refractive and reflective surfaces, interfaces of optical environments and diaphragms that influence the direction of light rays within the creation of the output light trace.

In modern headlights of motor vehicles, light sources consisting of LED light units are frequently used. An advantage of the LED light units is their long service life and compact dimensions. The documents JP2013252821A, AT512864B1, and US20110267455A1 describe light devices enabling creation of unlit or less lit parts of the carriageway as a combination of the low and high beam of light. During a drive of the motor vehicle with the high beam on, individual light units or their groups or rows can be optionally switched off to produce a dark unlit part in the light pattern on the carriageway in the place where the camera detects an oncoming vehicle. However, LED light units individually have a low light output, which can be increased by using a high number of LED light sources, but directing light beams from a higher number of LED light sources and creating a suitable light pattern is difficult and thus it still remains a technical problem.

The document US20130021810A1 discloses a lamp of a motor vehicle with a number of LED light sources that are arranged in a two-dimensional planar matrix in two directions, and their light intensity is adjustable depending on the position of a light element in one and/or the other direction. The intensity of the LED light sources can be adjusted or controlled variably by means of activation and deactivation of individual LED light sources, depending on the particular need of the area in front of the vehicle. To create a sufficiently large dark unlit part in the place where the camera detects an oncoming vehicle, the LED light sources are switched off and on in sections in the shape of vertical stripes; however, their margins are diffused and no suitable technical means is provided to control the sharpness of the edges of the vertical stripes and to create a sharp light image.

The document CZ20150092 discloses a light device that comprises a light source consisting of a system of light units and collimating optical elements for concentration of rays of the light units to the direction of the light axis of the vehicle x, where between the collimating optical elements and the output, lens diaphragms are arranged that are fitted with sets of openings for the passage of rays concentrated by the collimating optical elements. A disadvantage of this design is the fact that the optical system poses high requirements for the installation space, while the light device with an exact position of individual diaphragms and collimating elements features a relatively long optical axis whose direction corresponds to that of the light axis of the vehicle x, which restricts variability of the mechanical design of the light device, e.g., the design of the arrangement of the cooling system. Shortening of the optical axis results in a reduction of the focal distance of the optical elements, which enhances variability of the mechanical design, but the impact on the emission characteristics of the resulting light trace is negative.

In the prior art, a number of projection systems are known where the display trace consists of several projection patterns. A technical problem of these projection systems is creation of a compact display area with homogeneous light intensity all over the area, since at the contact edge of two neighbouring patterns or two light functions increased light intensity, or conversely, unlit places can be observed. Another disadvantage is the fact that if a sharp transition between the lit and unlit part of the carriageway is created, the human eye concentrates on the lit part in such a way that it virtually does not see the unlit part. But if the light/darkness boundary is not sharp, the human eye is able to better perceive the unlit part of the space in front of the vehicle.

A goal of the present invention is to eliminate the above-mentioned shortcomings of the prior art. Another goal is to design a light device whose adjustment system that achieves the required emission characteristic is structurally simple and at the same time enables efficient adjustment of the optical system, while individual elements of the optical system are efficiently arranged in the inner space of the lamp in such a way that the optical system does not pose high requirements for the installation space and is adaptable to the design of the light device. Still another goal is to realize the possibility of influencing the sharp or blurred character of the light trace edges and thus the light and darkness transition, and of creating various shapes of light traces with homogeneous light intensity distribution.

OBJECT OF THE INVENTION

The disadvantages of the prior art are substantially eliminated and the goal of the invention is achieved by a light device, especially a headlight of motor vehicles, comprising at least one light unit or a group of light units, at least one optical directing element adapted to direct the light beam emitted by the light unit or the light beams emitted by the group of light units to the required direction, and at least one output lens for passage of at least a part of the light rays of the light beam or of the light beams, to create a light pattern on the display surface, wherein on the route of the light beam between the optical directing element and the output lens there is at least one optical diaphragm element containing a system of trim edges to create, by means of the trim edges, the required shape of the cross-section of a part or parts of the light beam designed for transmission along the above mentioned route.

According to one of preferred embodiments, the system of the trim edges delimits holes in the optical diaphragm element.

According to another one of preferred embodiments, the system of the trim edges delimits in the optical diaphragm element at least one reflective surface for reflection of a light beam part or parts designed for transmission from a first section of the route to a second section of the route.

According to another one of preferred embodiments at least one of the optical directing elements is a collimating optical element, especially a collimating lens, in which first focal point the light unit is situated, or the light beams of the group of the light units are concentrated in the first focal point.

At least one of the optical directing elements may preferably be a light guide.

The light device may contain an optical diaphragm element with the design of a reflective diaphragm containing at least one reflective surface for reflection of a light beam part or parts designed for transmission from a first section of the route to a second section of the route.

The light device may contain another optical diaphragm element with the design of a diaphragm containing a system of trim edges, wherein the diaphragm is situated between the reflective diaphragm and the output lens.

The light device may contain another optical diaphragm element with the design of a diaphragm containing a system of trim edges, wherein the diaphragm is situated between the optical directing element and the reflective diaphragm.

The light device according to the present invention may contain at least two optical diaphragm elements, one of them having the design of the first diaphragm containing a system of trim edges, and the other one having the design of the second diaphragm containing a system of trim edges and being situated between the output lens and the first focal point of the output lens, wherein the first diaphragm is located either adjacent to the focal plane of the output lens, or at a certain distance from the focal plane of the output lens, and wherein with the increasing distance from the focal plane the blur of the edges of at least some margins of the resulting light pattern on the display surface is increased.

The second diaphragm may be arranged in such a way that it can be moved in the direction towards the output lens and in the direction away from the output lens to increase the difference in sharpness between the margins created by the second diaphragm and the margins created by means of the first diaphragm and/or the reflective diaphragm.

The light device may contain a group of light units, wherein between the group of the light units and the optical directing element a group of front-positioned optical elements, especially collimating lenses, is situated to concentrate the light rays of the group of the light units to the first focal point of the optical directing element, especially a collimating optical element, wherein the light units lie in the first focal points of the front-positioned optical elements.

The route of the light beam between the optical directing element and the output lens may be substantially linear, and the optical axis of the output lens and the optical axis of the optical directing element lie in it.

The said route of the light beam between the optical directing element and the output lens may comprise two sections, connected in the place of the reflective diaphragm and making an obtuse, right or acute angle.

The light device may contain multiple light units, or multiple groups of light units, and multiple output lenses whose number corresponds to the number of the light units or the number of the groups of light units to create a composite light pattern on the display surface that includes individual light patterns created by the rays of individual light units or individual groups of light units.

The output lenses may preferably be arranged in such a way that they create a composite output lens.

Preferably, between each pair of the neighbouring output lenses a diaphragm is situated to prevent the rays generated by the same light unit or the same group of light units from passing through both the neighbouring output lenses.

The route of the light beam between the optical directing element and the output lens may have the same length for all the light units or groups of light units, and equal to the distance of the focal plane of the output lens from the output lens.

The optical diaphragm elements and the output lenses may be configured in such a way that the light patterns forming a composite light pattern partly overlap each other with some of their margins.

OVERVIEW OF FIGURES IN THE DRAWINGS

The invention will be clarified in a more detailed way with the use of its embodiment examples with references to attached drawings, where:

FIG. 10b shows an example of separate light patterns created with the use of the holes of FIG. 10a;

FIG. 17 shows an eleventh example of an embodiment of the light device in accordance with the invention.

EXAMPLES OF EMBODIMENTS

Figure 1:
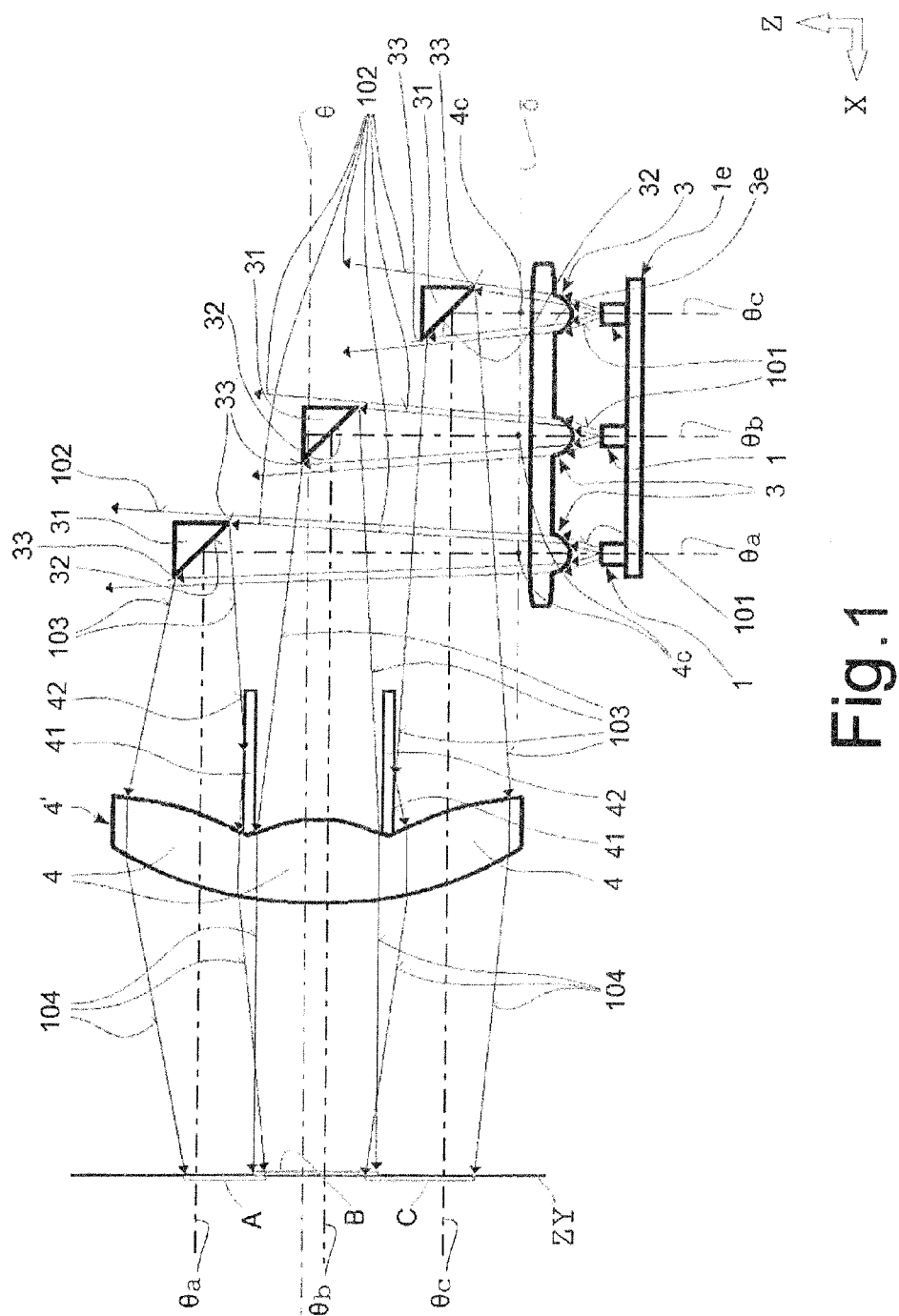
FIG. 1 shows a first example of an embodiment of the light device in accordance with the invention.

According to FIG. 1, which shows the first embodiment of the light device in accordance with the invention, the light device comprises a light source, consisting of a set or sets of light units 1, arranged on the carrier plate 1e, situated substantially in parallel (i.e. in parallel or approx. in parallel) to the optical axis θ of the light device and a diaphragm set containing reflective diaphragms 31 for creation of trim edges in the final light trace. On the light axes θa, θb, θc of the light units 1, in the transmission direction of the light rays 101, a collimating optical element 3 is arranged, containing collimating lenses 3e for concentration of the light rays 101 of the light units 1 to the direction of the light axes θa, θb, θc of the light units 1. The collimating optical element 3 is arranged in parallel to the optical axis θ of the light device. In the transmission direction of the light rays, after the collimating optical element 3 reflective diaphragms 31 are arranged that are fitted with reflective surfaces 32 for directing a part of collimated light beams 102, concentrated by the collimating optical element 3, to the direction of the optical axis θ of the light device. After the reflective trim diaphragms 31, in the transmission direction of the reflected light rays 103 the output lens 4 is arranged, through which the output light rays 104 exit onto the display surface ZY. A separate lens 4 is assigned to each light axis θa, θb, θc, while the lenses 4 create a composite output lens 4', where the first focal points 4c of the output lenses 4 form a focal plane δ situated between the collimating optical element 3 and the reflective trim diaphragms 31. Between the reflective trim diaphragms 31 and the output lens, horizontal diaphragms 41 equipped with a reflective surface 42 are situated for separation of individual reflected light rays 103 of the light axes θa, θb, θc of the light units 1 and to eliminate the spurious light emitted from a non-assigned light unit 1.

The edges 33 of the reflective trim diaphragms 31 restrict the collimated light beams 102 emitted from the collimating optical element 3, forming the trim margins a, b, c delimiting closed patterns A, B, C on the display surface ZY. The shape of the patterns A, B, C corresponds to the shape of the reflective surfaces 32 or the shape of the light parts of the reflective surfaces 32.

Figure 2:
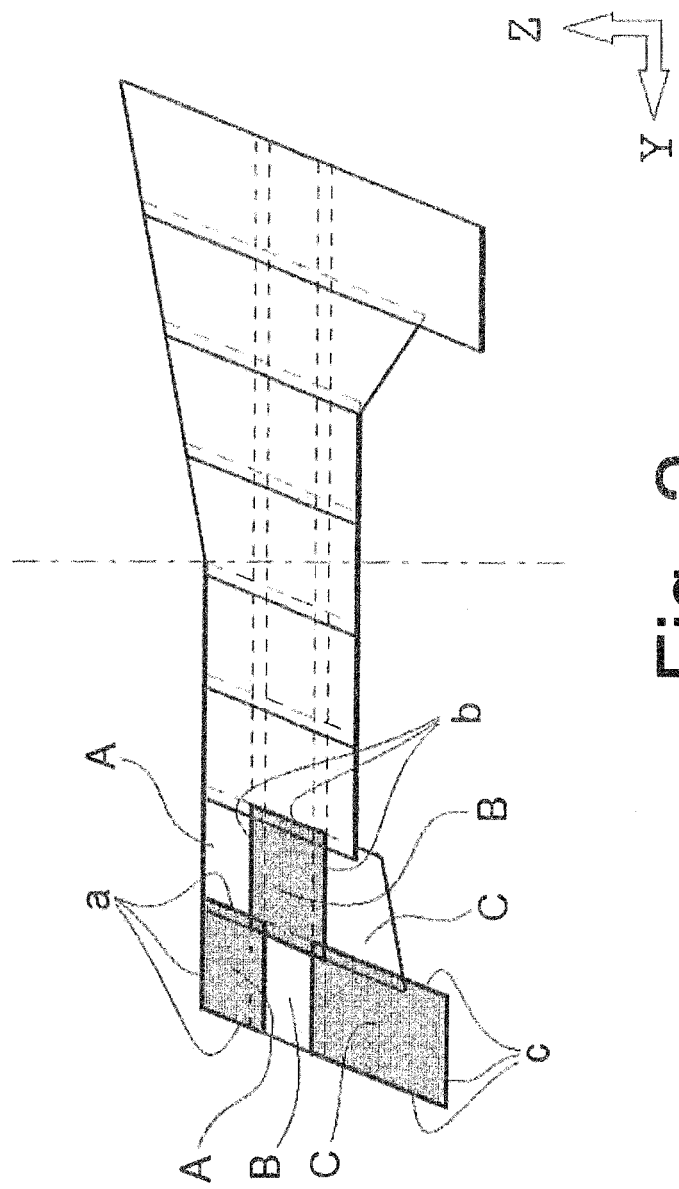
FIG. 2 shows an example of light patterns that can be created on the display surface by the light device in accordance with FIG. 1.

FIG. 2 shows an example of light patterns A, B, C that can be created by the light device in accordance with FIG. 1 on the display surface ZY. The light image consists of more individual light patterns A, B, C, which partly overlap each other with their neighbouring edges a, b, c and some edges a, c create the top or bottom transition line, respectively, between light and darkness on the display surface. At least one light unit 1, not shown here, belongs to each of the patterns.

Figure 3:
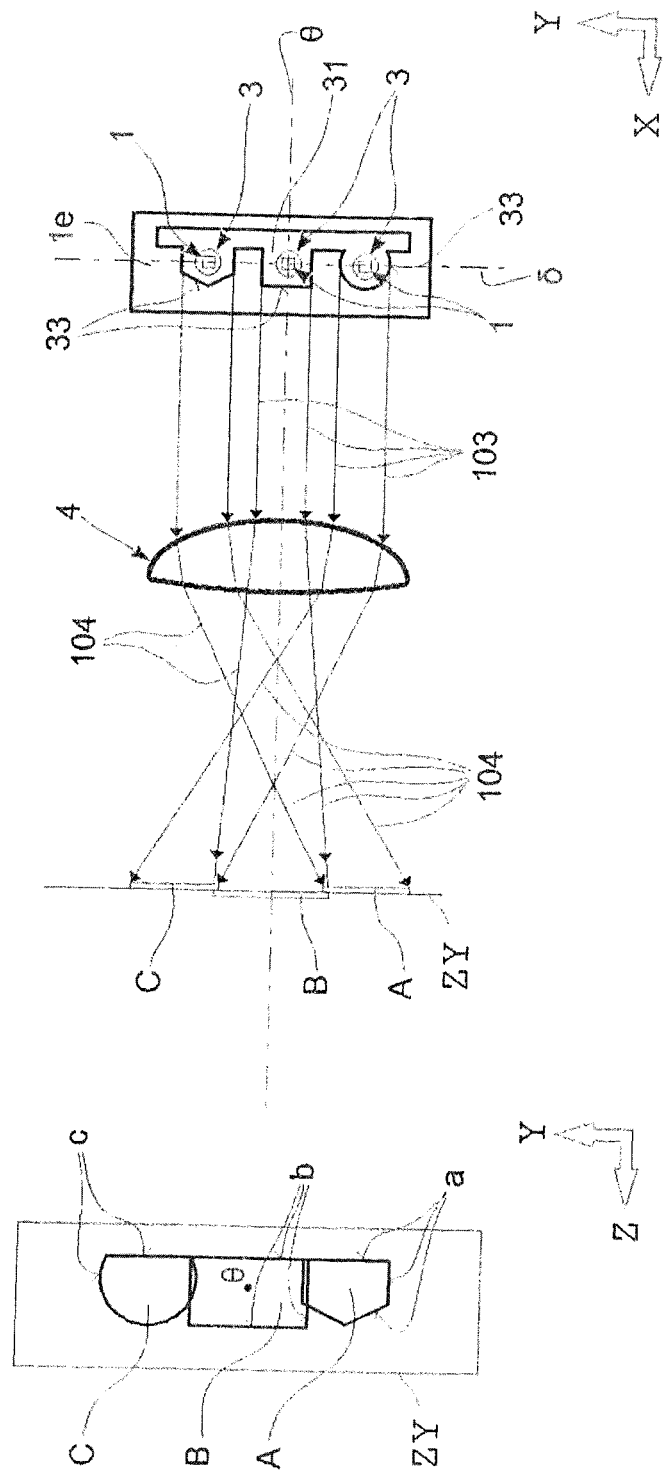
FIGS. 3 and 4 show a second example of an embodiment of the light device in accordance with the invention.
Figure 4:
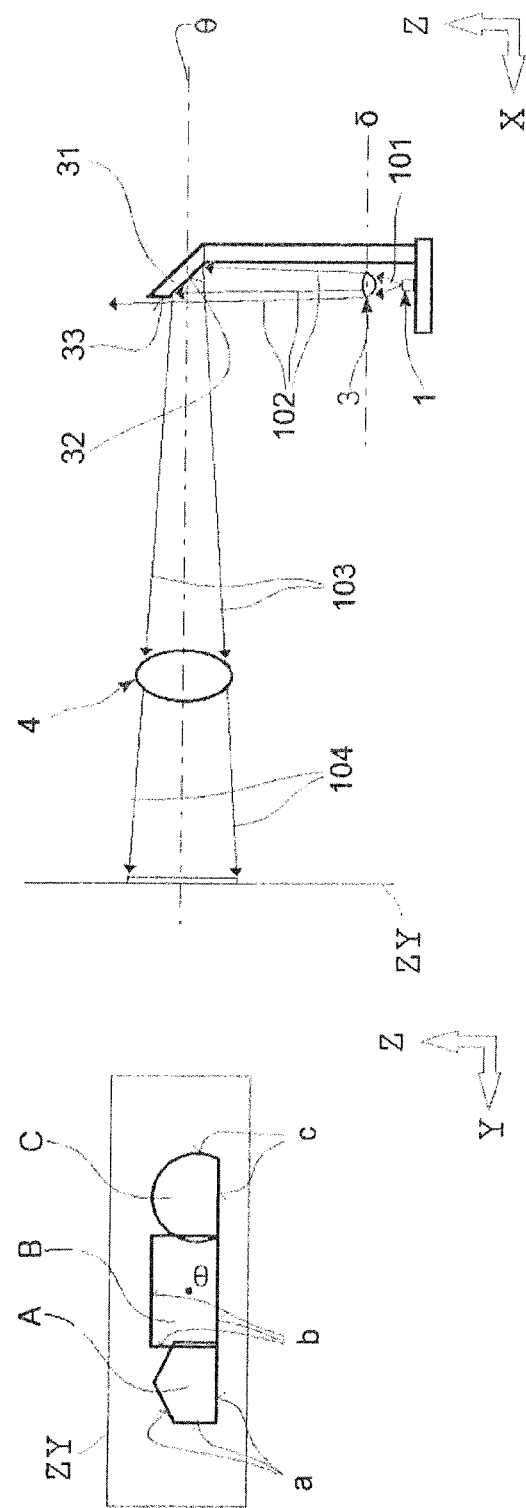

FIG. 3 and FIG. 4 show a second example of an embodiment of the light device where the output rays 104 emitted from one output lens 4 are generated by multiple light units 1. A separate reflective trim diaphragm 31 belongs to each light unit 1, having a shape corresponding to the shape of the pattern A, B, C, requested on the display surface ZY.

The edges 33 of the reflective trim diaphragms 31 in their default position laterally restrict the collimated light beams 102, concentrated by the collimating optical element 3, and the reflective surface 32 creates a beam of reflected light rays 103 of the requested shape and direction, creating individual light patterns A, B, C with the required shapes of their margins a, b, c on the display surface ZY.

Figure 5:
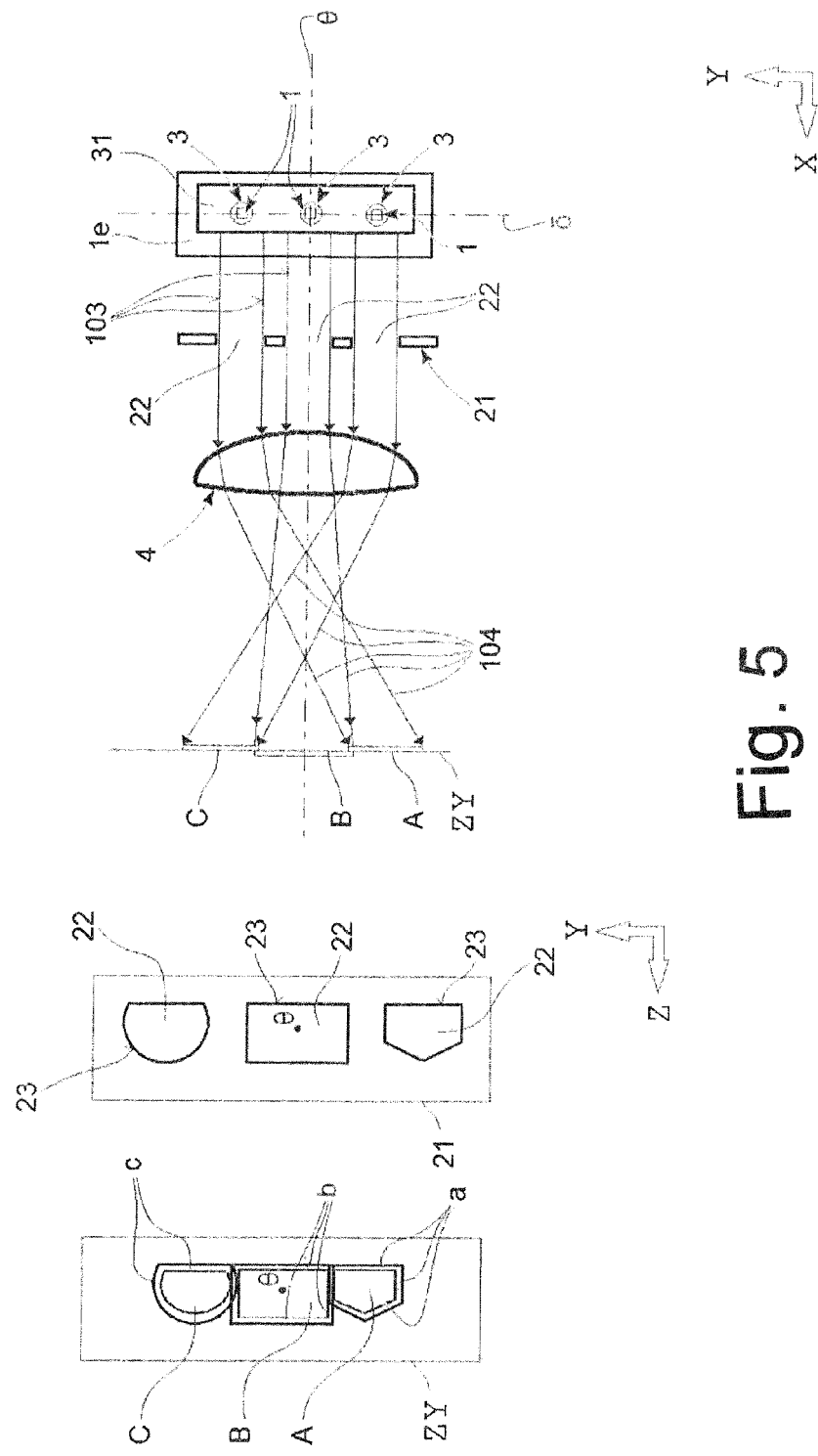
FIG. 5 shows a third example of an embodiment of the light device in accordance with the invention.

FIG. 5 shows a third example of an embodiment of the light device where the reflected light rays 103 emitted from one reflective surface 32 are generated from more than one light units 1. Between the reflective surface 32 and the output lens 4, at a certain distance from the focal plane δ a diaphragm element is situated in the form of the second diaphragm 21, fitted with holes 22 having edges 23 restricting the passage of some reflected light rays 103. After the second diaphragm 21, in the transmission direction of the reflected light rays 103, an output lens 4 is arranged through which the light rays are emitted onto the display surface ZY, creating the pattern A, B, C in the required place while with the increasing said distance from the focal plane δ blur of the edges of the margins a, b, c of the resulting light patterns A, B, C on the display surface ZY increases.

Figure 6A:
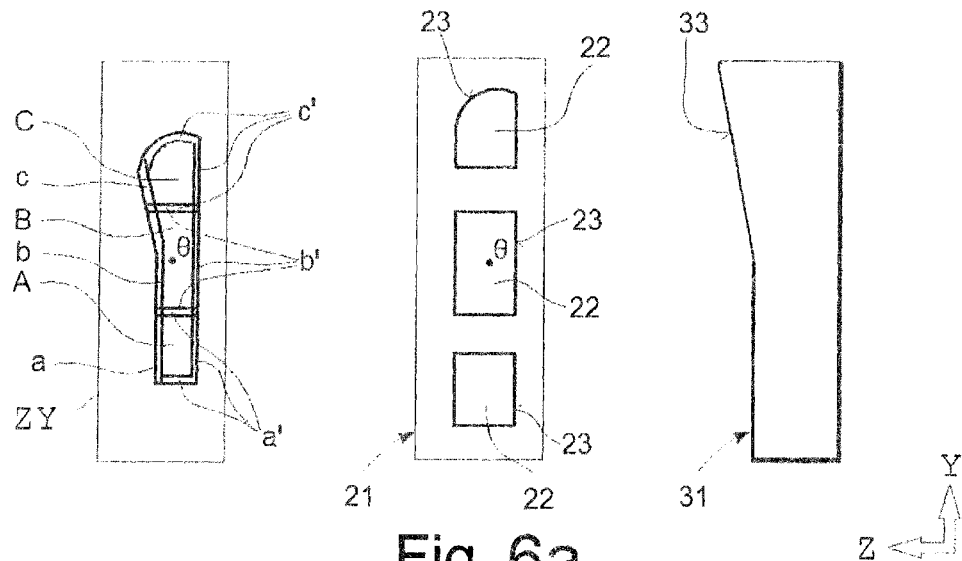
FIGS. 6a and 6b show a fourth example of an embodiment of the light device in accordance with the invention.
Figure 6B:
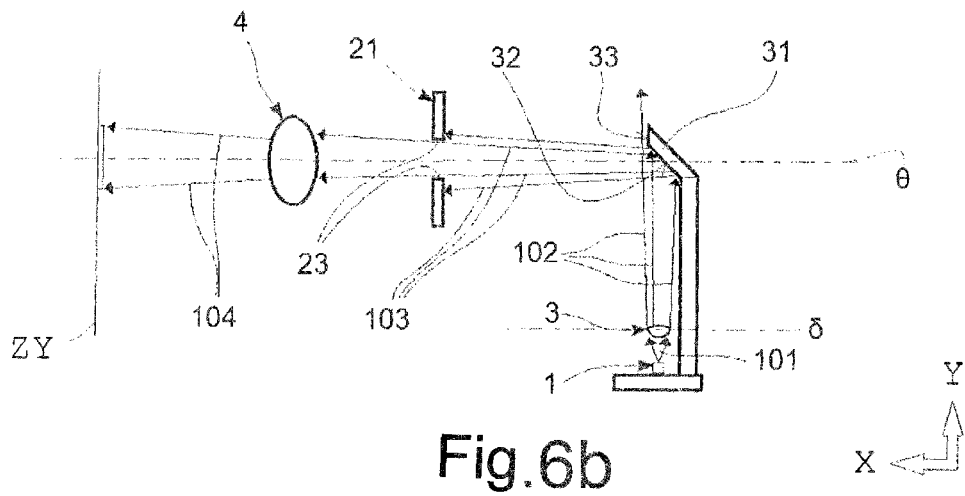

FIG. 6a and FIG. 6b show a fourth example of an embodiment comprising a system of trim edges 23, 33 for creation of the light patterns A, B, C. The diaphragm element in the design of the trim edge 33 of the trim diaphragm 31 restricts the passage of some reflected light rays 103, creating the first part of the margins a, b, c while the margins a, b or b, c overlap each other. The trim edges 23 of the holes 22 of the second diaphragm 21 also restrict the passage of some reflected light rays 103, creating the second part of the margins a', b', c' of the resulting light patterns A, B, C on the display surface ZY. Since with the increasing distance from the focal plane δ the blur of some edges of the margins a, b, c increases, the resulting light patterns have different sharpness in the first part of the margins a, b, c and different sharpness in the other part of the margins a', b', c', while the margins a, b, c overlap each other.

Figure 7:
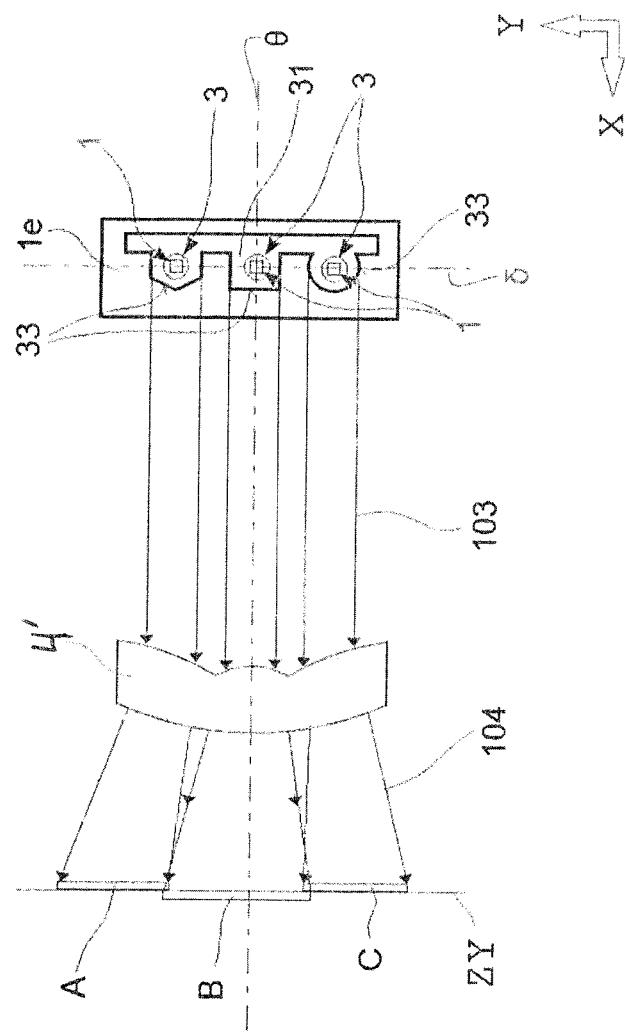
FIGS. 7 and 8 show a fifth example of an embodiment of the light device in accordance with the invention.
Figure 7:
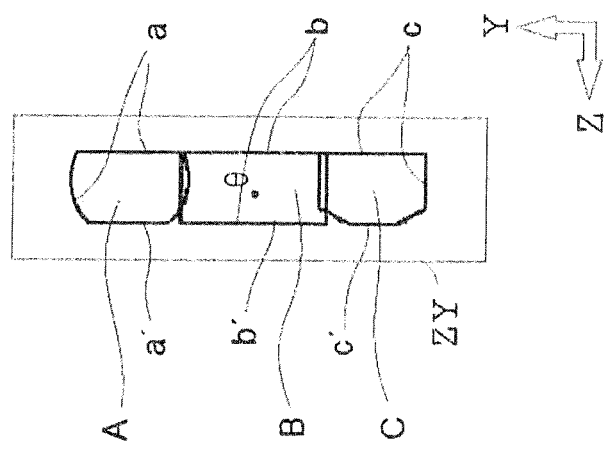
Figure 8:
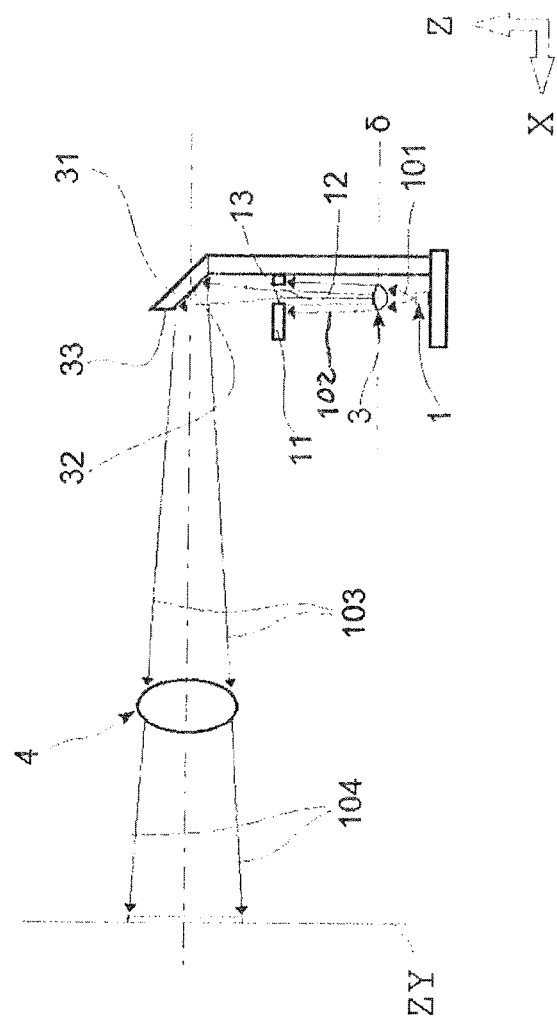
Figure 8:
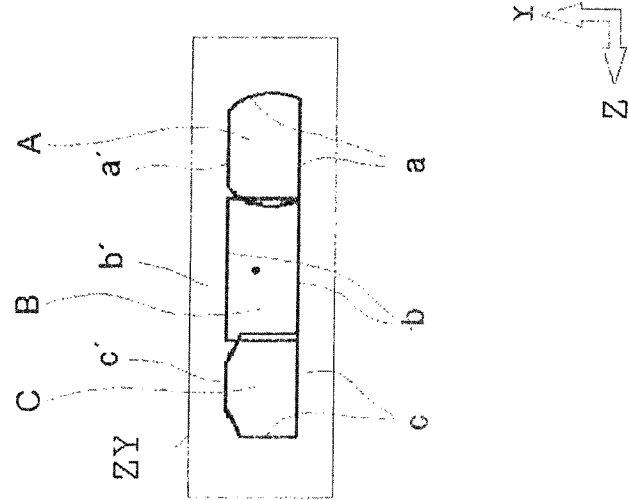

FIG. 7 and FIG. 8 show a fifth example of an embodiment of the light device where the collimated light beams 102 emitted from the collimating optical elements 3 are generated from more than one light units 1. Between the reflective trim diaphragm 31 and the collimating optical element 3, a diaphragm element is situated in the form of the first diaphragm 11, whose trim edges 13 create holes 12. The diaphragm 11 partly restricts the passage of the collimated light beam 102. In the transmission direction of the reflected light rays 103 there is also an output lens 4 through which the output light rays 104 are emitted that create the patterns A, B, C in the required place of the display surface ZY. The shape of the margins a', b', c' is defined by the edges 13 created in the diaphragm 11 and the margins a, b, c are defined by the edges 33 of the reflective trim diaphragms 31.

Figure 9:
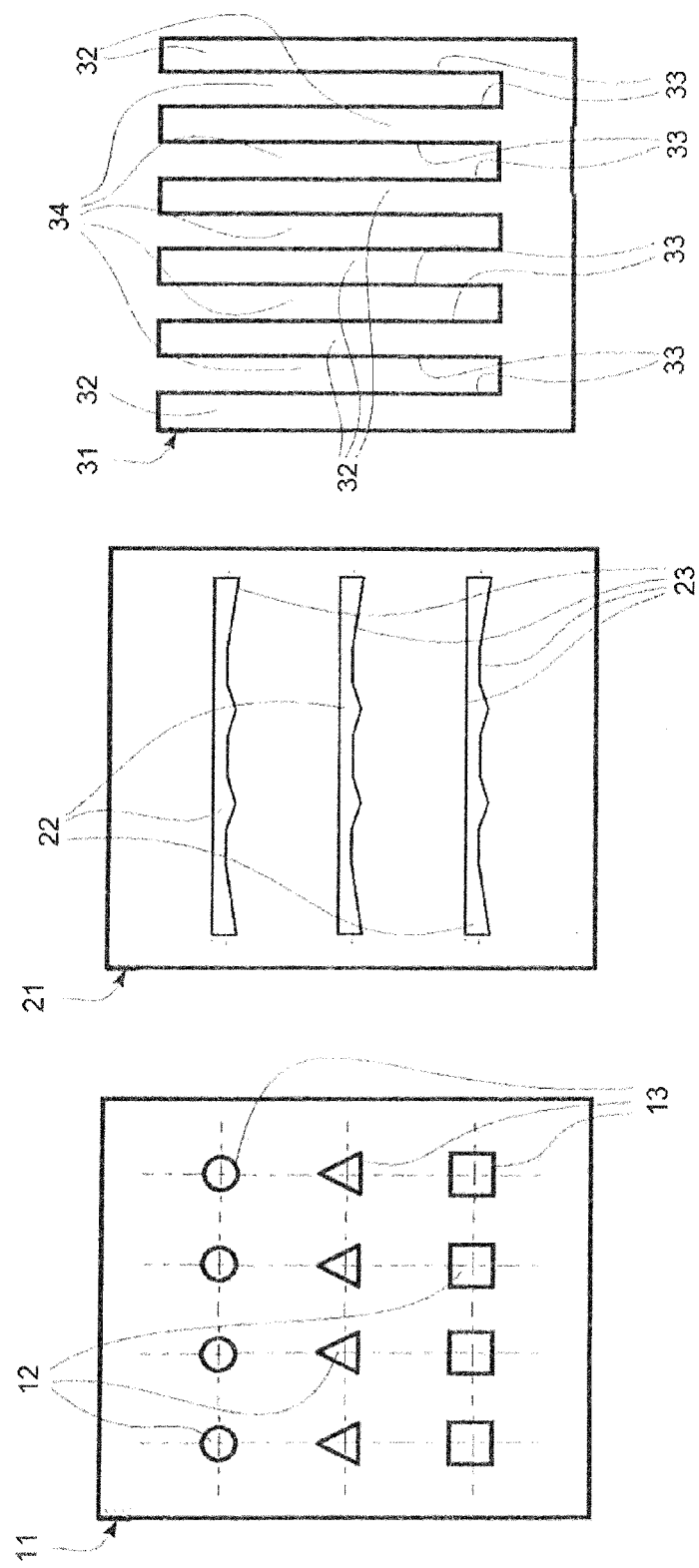
FIG. 9 shows an example of embodiments of the diaphragms for use in the light device in accordance with the invention.

FIG. 9 shows examples of the designs of the diaphragms 11, 21, 31. The edges 13, 23, 33 of the diaphragms 11, 21, 31 can have a general shape for creation of various shapes of the holes 12, 22, 34 while the edges 13, 23, 33 of the diaphragms 11, 21, 31 create the margins a, b, c, a', b', c' of the patterns A, B, C on the display surface ZY. The edges 33 of the reflective trim diaphragm 31 and/or the edges 13 of the first diaphragm 11 and/or the edges 23 of the second diaphragm 21 restrict the light beams passing through the holes 12, 22, but they are not trim edges in the sense that they would directly create the shape of the light and darkness boundary curve on the display surface.

Figure 10A:
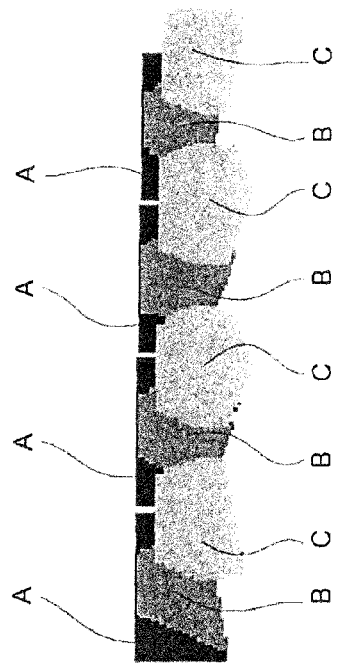
FIG. 10a shows an example of the shape of holes in the diaphragms.
Figure 10B:
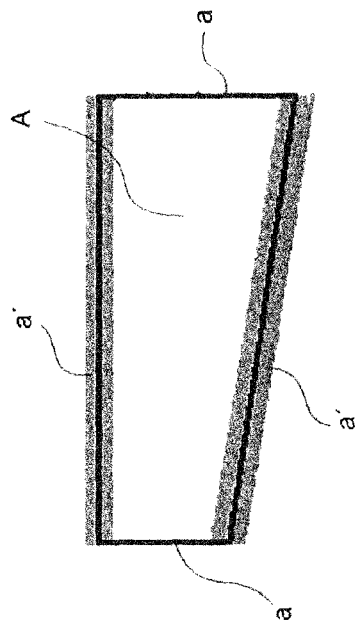
Figure 10C:
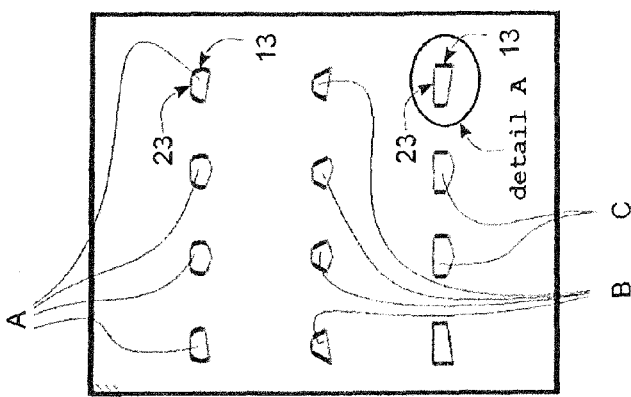
FIG. 10c shows an example of the light trace created on the display surface by the light patterns of FIG. 10b.
Figure 10D:
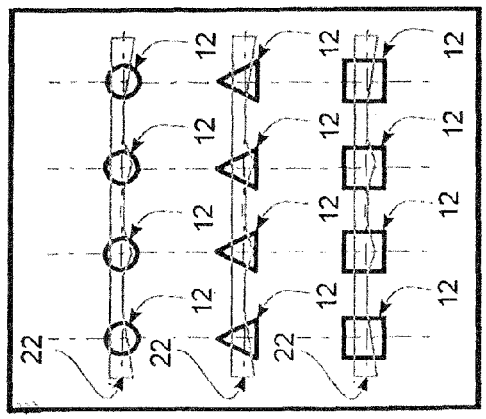
FIG. 10d shows the light and darkness boundary at individual edges of a hole as shown in FIG. 10b.

Moving of the collimating optical elements 3 and/or the first diaphragm 11 and/or the second diaphragm 21 and/or the reflective trim diaphragm 31 in the direction of the light axes θa, θb, θc closer to the focal plane δ results in a change of the intensity and homogeneity of the light trace made up of the patterns A, B, C and sharpness of the individual margins a, b, c, a', b', c' on the display surface ZY. FIG. 10a shows how a targeted shape of the edges 13, 23 in various areas of the light system of the light units 1 can be used to achieve a suitable shape of the individual light patterns A, B, C, shown in FIG. 10b, creating an integral light trace on the display surface ZY, as indicated in FIG. 10c. The edges 13 of the first diaphragm 11 and the edges 23 of the second diaphragm 21 restrict the light beams passing through the holes 12, 22, but they are not trim edges in the sense that they would directly create the shape of the light and darkness boundary curve on the display surface. As shown in FIG. 10d, the first diaphragm 11 lies on the focal plane δ and in the pattern A it creates a sharp boundary of light and darkness by the margins a while the second diaphragm 21 is situated at a certain distance from the focal plane δ and it creates a blurred boundary of light and darkness by the margins a'.

Figure 11:
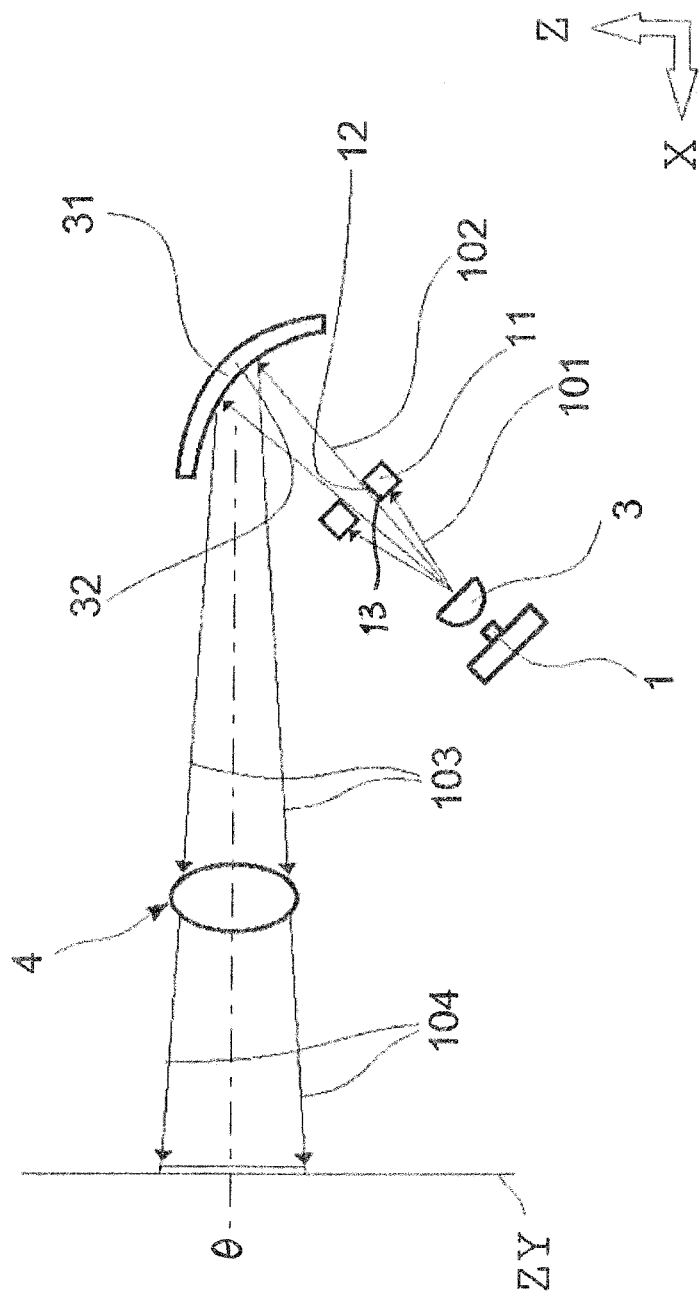
FIG. 11 shows a sixth example of an embodiment of the light device in accordance with the invention.

FIG. 11 shows a sixth example of an embodiment of the light device where reflective diaphragm 31 is used and the device contains a shaped reflective surface 32 e.g. in the form of a reflector, while the edges 13 of the holes 12 of the first diaphragm 11 are tilted with regard to the direction of the optical axis θ.

Figure 12:
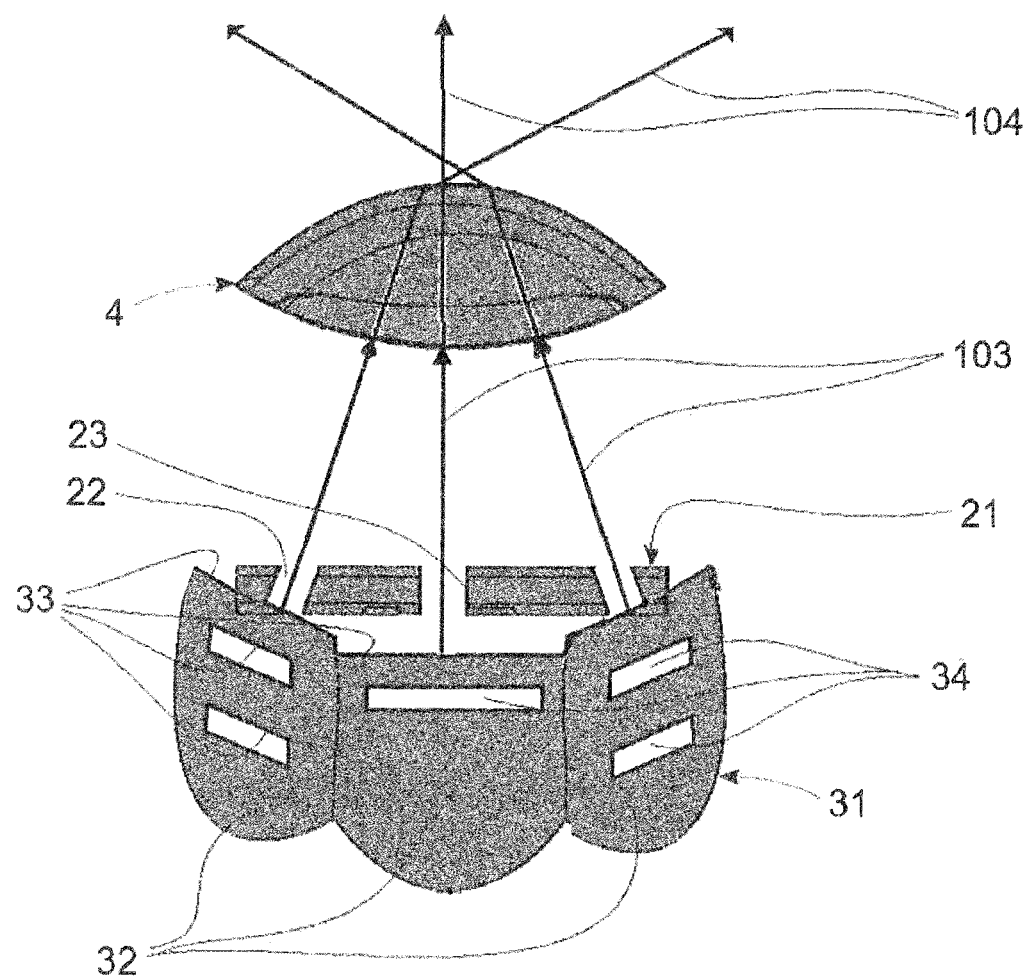
FIG. 12 shows a seventh example of an embodiment of the light device in accordance with the invention.

FIG. 12 shows a seventh example of an embodiment of the light device where reflective diaphragms 31 are used, containing multiple spatially shaped reflective surfaces 32, e.g. in the form of a reflector, and more trim edges 33 of the holes 34 while the patterns A, B, C are created together with the use of the shapes of holes 22 of the second diaphragm 21.

Figure 13:
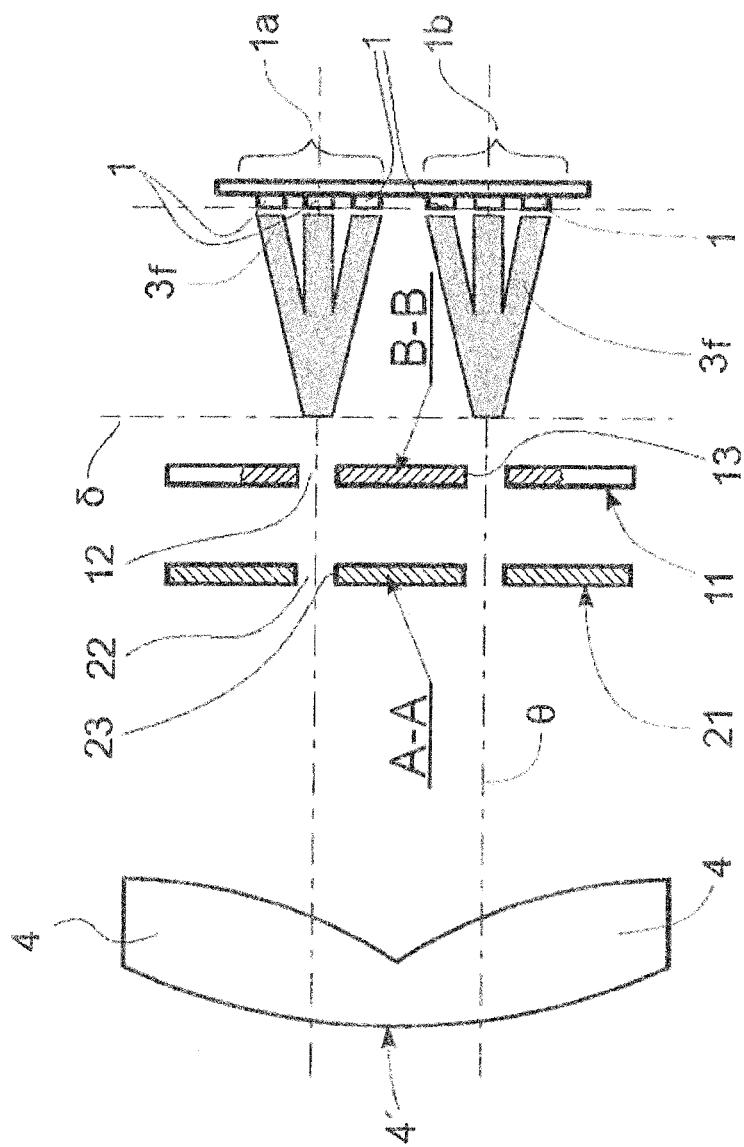
FIG. 13 shows an eighth example of an embodiment of the light device in accordance with the invention.

FIG. 13 shows the eighth example of an embodiment of the light device in accordance with the invention where instead of the collimating optical elements used in the above mentioned previous embodiments light guides 3f are used that are configured in such a way to direct and guide the light beams emitted from the light units 1 arranged in the light unit systems 1a and 1b to the required direction and place while these places of exit from the light guides 3f lie approximately on the focal plane δ.

Figure 14:
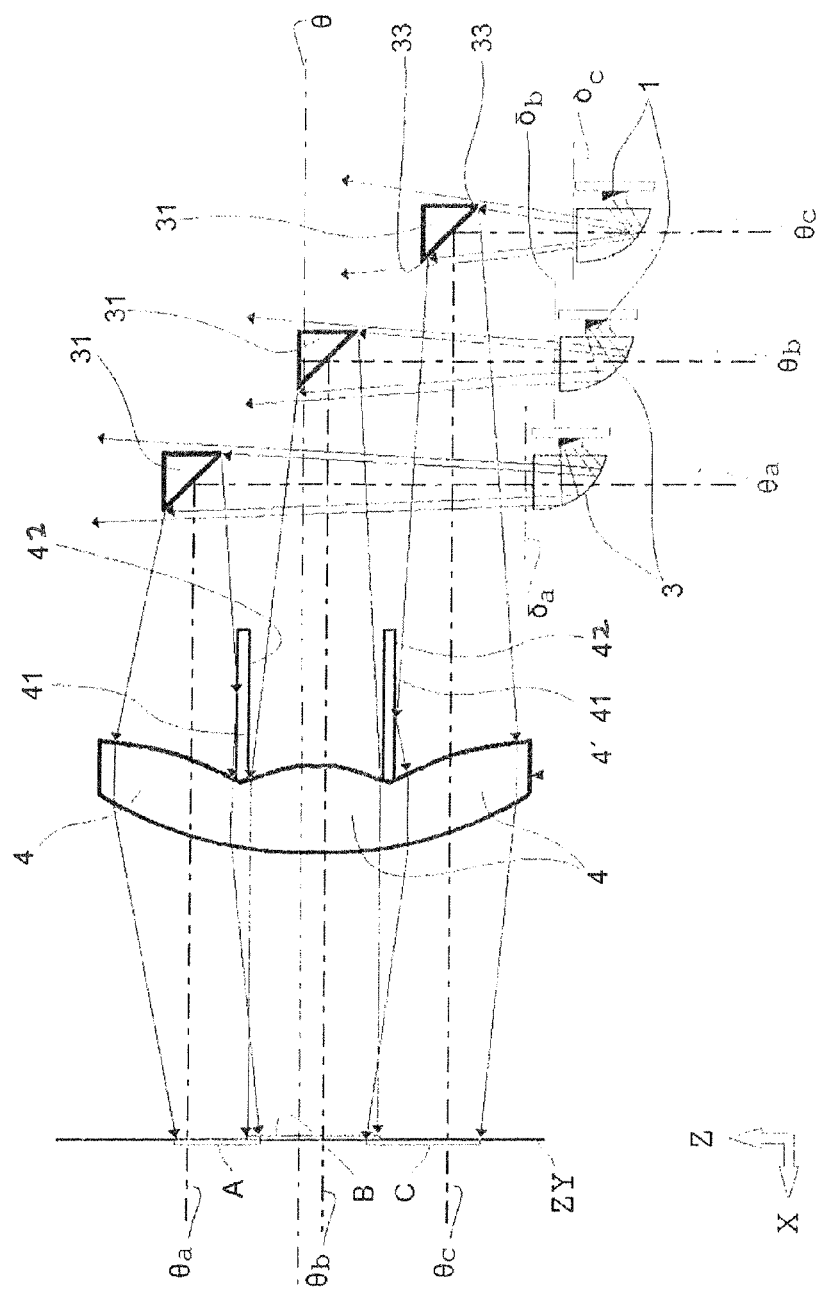
FIG. 14 shows a ninth example of an embodiment of the light device in accordance with the invention.

FIG. 14 shows an ninth example of an embodiment of the light device in accordance with the invention, where individual light axes θa, θb, θc of the light units 1 and the focal planes 6a, 6b and 6c, where the first focal points are situated, are mutually offset while the distance of the first focal point of the output lens 4 is the same on all the axes θa, θb, θc. Between each pair of the neighbouring output lenses 4 forming a composite output lens 4' a horizontally oriented diaphragm 41 having reflective surface 42 is situated and adapted to prevent the rays generated by the same light unit 1 from passing through both the neighbouring output lenses 4.

Figure 15:
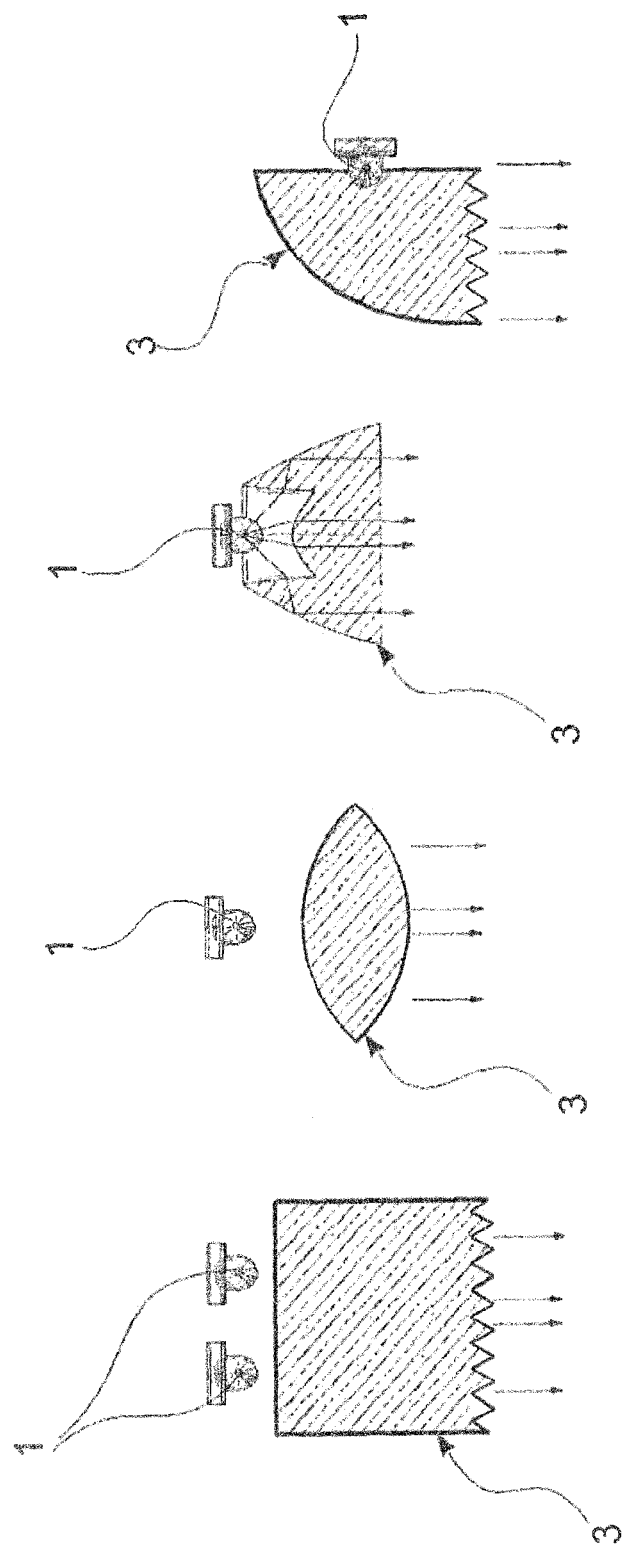
FIG. 15 shows an example of an embodiment of the collimating optical element.

FIG. 15 shows examples of embodiments of the collimating optical element 3. As indicated above, the collimating optical element 3 is an optical element adapted to direct the light beam to the required direction with the advantage of a collimated beam.

Figure 16:
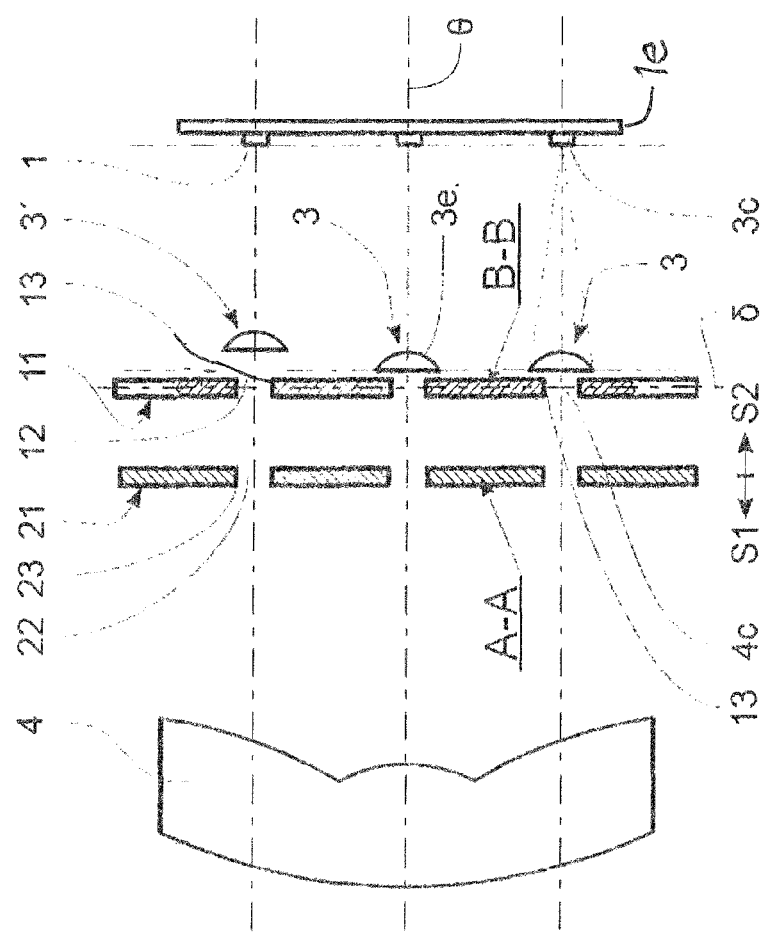
FIG. 16 shows a tenth example of an embodiment of the light device in accordance with the invention.

FIG. 16 shows a tenth example of an embodiment of the light device in accordance with the invention. The light device comprises a light source consisting of a system of light units 1, arranged on a carrier plate 1e, lying on a plane that is perpendicular to the light axis θ of the light device. On the axes of the light units 1 parallel to the light axis θ, in the transmission direction of the light rays, collimating optical elements 3, 3' are arranged to concentrate the light rays of the light units 1 to the direction of the light axis θ. The collimating optical elements 3, 3' are arranged on a plane perpendicular to the light axis θ of the light device. The collimating optical elements 3 e.g., consist of collimating lenses 3e, but they may also consist of light guides arranged with their axes in or in parallel to the direction of the light axis θ of the light device.

In the transmission direction of the light rays, after the collimating optical elements 3, 3', two diaphragms are consecutively arranged, the first diaphragm 11 and the second diaphragm 21, fitted with openings or holes 12, 22 for the passage of the light beams concentrated by the collimating optical elements 3, 3'. After the second diaphragm 21, in the transmission direction of the light rays, an output lens 4 is arranged through which the light rays exit onto the display surface. The first focal point 4c of the output lens 4 lies on the first focal plane δ.

The partial section B-B through the first diaphragm 11 is a longitudinal section on a horizontal plane parallel to the light axis θ of the light device. In FIG. 16, the partial section B-B is displayed in the position rotated from the default position by 90° around the optical axis θ of the light device. The edges 13 of the holes 12 of the first diaphragm 11 are oriented vertically in the default position. The holes 12 of the first diaphragm 11 may e.g. have a longitudinal shape, so the edges 13 of the holes 12 laterally restrict the light beams passing through the holes 12. The second diaphragm 21 is shown in a vertical longitudinal section A-A on a plane perpendicular to the light axis θ of the light device. The edges 23 of the holes 22 of the second diaphragm 21 are oriented horizontally. The holes 22 of the second diaphragm 21 may e.g. have a longitudinal shape, so the edges 23 of the holes 22 restrict the light beams passing through the holes 22 at the top and at the bottom.

If the holes 12 of the first diaphragm 11 and the holes 22 of the second diaphragm 21 are longitudinal and their lengths are greater than their widths, the edges 13 of the holes 12 of the first diaphragm 11 and the edges 23 of the holes 22 of the second diaphragm 21 create closed patterns on the display surface. The edges 13, 23 of the holes 12, 22 may be oriented in the opposite way than shown in FIG. 16, which means that the edges 13 of the holes 12 may be oriented horizontally in their default position and the edges 23 of the holes 22 may be oriented vertically. This can be achieved by a mere mutual interchange of the first diaphragm 11 and the second diaphragm 21. The edges 13, 23 of the holes 12, 22 may have a general shape that may be different for different holes. A targeted shape in various areas of the system of LED light units can be used to achieve a suitable shape of light patterns created on the display surface. The edges 13 of the first diaphragm 11 and the edges 23 of the second diaphragm 22 restrict the light beams passing through the holes 12, 22, but they are not trim edges in the sense that they would directly create the shape of the light and darkness boundary curve on the display surface.

In the transmission direction of the light rays, collimating optical elements 3 adjoin the holes 12 of the first diaphragm 11. The collimating optical elements 3 may consist of collimating lenses 3e whose first focal points 3c lie on the plane of the light units 1 arranged on the optical axes of the collimating lenses. However, the location of the collimating optical elements 3' may be set generally in a different position between the first diaphragm 11 and the light units 1. A shift of the collimating elements 3' in the direction of the optical axis θ is used to alter the intensity and homogeneity of the image on the display surface ZY. Moving the collimating optical elements 3' away from the first focal plane of the lens 4 causes a reduction of the light intensity and an increase of the homogeneity of the light image. The homogeneity of light means distribution of light on the display surface ZY. In principle, light is distributed on the display surface ZY in accordance with the Gauss function, whose peak is in the middle of the image and in the direction towards the image margins the value of the function decreases. An increase of homogeneity means a change of the curve of light distribution on the display surface ZY in such a way that the peak value of the function is reduced and the value of the function at the image margins is increased. If the collimating optical elements 3' are moved away from the focal plane of the lens 4, the shape of the light distribution curve gets flatter, in the middle of the image, the light distribution shape gets a lower value and at the image margins the light distribution curve gets a higher value; the brightness of the image on the display surface is generally more uniform. The area under the light distribution curve is reduced, which means that the lighting intensity is reduced, too. The first diaphragm 11 passes through or is adjacent to the first focal point 4c of the output lens 4. The second diaphragm 21 is arranged between the first diaphragm 11 and the output lens 4. The position of the second diaphragm 21 is adjustable longitudinally in the S1-S2 direction of the light axis θ.

FIG. 17 shows an eleventh example of an embodiment of the light device in accordance with the invention. The light device comprises parts taken over from FIG. 16, namely the collimating optical elements 3, the first diaphragm 11, the second diaphragm 21 and the output lens 4. However, the light units 1, arranged in the same way as in the previous embodiment example on a plane perpendicular to the light axis θ, are divided and arranged in groups of lights 1a, 1b. To each collimating optical element 3 one group 1a, 1b of light units 1 is assigned, and between each group 1a, 1b of the light units 1 and the collimating element 3 there is always one group 2a, 2b of pre-arranged optical elements 2. The pre-arranged optical elements 2 consist of collimating lenses 2e. The pre-arranged optical elements 2 consisting of the collimating lenses 2e concentrate the light rays of each group 1a, 1b of the light units 1 to the first focal point 3c of the respective collimating element 3 while the light units 1 lie in the first focal points 2c of the pre-arranged optical elements 2.

LIST OF REFERENCE MARKS

1 light unit
1a, 1b group of light units
1e carrier plate
2 pre-arranged optical element
2a, 2b group of pre-arranged optical elements
2c first focal point
2e collimating lenses
3 collimating optical element
3' collimating optical element
3c *first focal point*
3e *collimating lenses*
3f *light guide*
4 output lens
4' composite output lens
4c *first focal point*
δ focal plane
δa, δb, δc focal planes
11 first diaphragm
12 hole
13 edge
21 second diaphragm
22 hole
23 edge
31 reflective diaphragm
32 reflective surface
33 edge
34 hole
41 horizontal diaphragms
42 reflective surface
A pattern
a margin
a' margin
B pattern
b margin
b' margin
C pattern
c margin
c' margin
θ optical axis
θa light axis
θb light axis
θc light axis
101 light ray
102 collimated light beam
103 reflected light beam
104 output light beam
ZY display surface
X, Y, Z—coordinate axes of the Cartesian coordinate system

What is claimed is:

1. A light device for motor vehicles comprising at least one light unit (1), or a group (1a, 1b) of light units (1), at least one optical directing element (3, 2e, 3f), adapted to direct a light beam emitted by the light unit (1) or light beams emitted by the group (1a, 1b) of light units (1) to a required direction, and at least one output lens (4) for passage of at least a part of light rays of the light beam or light beams to create a light pattern (A, B, C) on a display surface (ZY), wherein on a route of the light beam between the optical directing element (3, 2e, 3f) and the output lens (4) there is at least two optical diaphragm elements (11, 21, 31) each containing a system of trim edges (13, 23, 33) to create, by means of the trim edges (13, 23, 33), a required shape of a cross-section of a part or parts of the light beam designed for transmission along the above-mentioned route, wherein the at least two optical diaphragm elements comprise a first diaphragm and a second diaphragm, wherein the first diaphragm comprises a hole delimiting diaphragm (11, 21) having trim edges (13, 23) delimiting holes (12, 22) in the first diaphragm, wherein the second diaphragm comprises either another hole delimiting diaphragm (21, 11) or a reflective diaphragm (31) having a system of trim edges (33) delimiting at least one reflective surface (32) in the second diaphragm for reflection of a light beam part.

2. The light device according to claim 1, wherein the second diaphragm is the reflective diaphragm (31), and the first diaphragm is situated between the optical directing element (3, 2a, 3f) and the reflective diaphragm (31).

3. The light device according of claim 1, wherein at least one of the optical directing elements (3, 2e, 3f) is a collimating optical element (3) having a first focal point in which the light unit (1) is situated, or having the light beams of the group (1a, 1b) of light units (1) concentrated in the first focal point.

4. The light device according to claim 1, wherein at least one of the optical directing elements is a light guide (3f).

5. The light device according to claim 1, wherein the second diaphragm (21) is a hole delimiting diaphragm (21, 11), the light device thus comprising first and second hole delimiting diaphragms (11, 21), the second hole delimiting diaphragm (21) being situated between the output lens (4) and a first focal point (4c) of the output lens (4), and the first hole delimiting diaphragm (21) being located either adjacent to a focal plane (δ) of the output lens (4), or at a certain distance from the focal plane (δ) of the output lens (4), and wherein with the increasing distance from the focal plane (δ) the blur of the edges of at least some of margins (a, b, c) of the resulting light pattern (A, B, C) on the display surface (ZY) is increased.

6. The light device according to claim 5, wherein the second hole delimiting diaphragm (21) is arranged in such a way that it can be moved in a direction (S1) towards the output lens (4) and in a direction (S2) away from the output lens (4) to increase a difference in sharpness between the margins (a, b, c) created by the second hole delimiting diaphragm (21) and margins (a', b', c') of light pattern (A, B, C) created by means of the first hole delimiting diaphragm (11).

7. The light device according to claim 5, wherein between the group (1 a, 1 b) of light units (1) and the optical directing element (3), a group (2 a, 2 b) of front-positioned optical elements (2) is situated to concentrate the light rays of the group (1 a, 1 b) of light units (1) to a first focal point (3 c) of the optical directing element (3) and wherein light units (1) lie in first focal points (2 c) of the front-positioned optical elements (2).

8. The light device according to claim 5, wherein the route of the light beam between the optical directing element (3, 2 e, 3 f) and the output lens (4) is substantially linear, and an optical axis of the output lens (4) and an optical axis of the optical directing element (3, 2 e, 3 f) lie in the route of the light beam.

9. The light device according to claim 1, wherein the second diaphragm is a reflective diaphragm (31), and further wherein the route of the light beam between the optical directing element (3) and the output lens (4) comprises two sections, connected adjacent the reflective diaphragm (31) and comprising an obtuse, right or acute angle.

10. The light device according to claim 1, wherein the light device includes multiple light units (1) or multiple groups (1 a, 1 b) of light units (1), and multiple output lenses (4) whose number corresponds to the number of light units (1) or light groups (1 a, 1 b) of light units (1), to create a composite light pattern (A, B, C) on display surface (ZY) that includes individual light patterns (A, B, C) created by the light rays of individual light units (1) or individual groups (1 a, 1 b) of light units (1).

11. The light device according to claim 10, wherein the output lenses (4) are arranged in such a way that they create a composite output lens (4').

12. The light device according to claim 10, wherein between pairs of neighbouring output lenses (4) a diaphragm (41) is situated to prevent the light rays generated by the same light unit (1) or the same group (1 a, 1 b) of light units (1) from passing through both of the neighbouring output lenses (4).

13. The light device according to claim 10, wherein the route of the light beam between the optical directing element (3, 2 e, 3 f) and the output lens (4) has the same length for all the light units (1) or groups of light units (1 a, 1 b), and is equal to the distance of a focal plane (δ) of the output lens (4) from the output lens (4).

14. The light device according to claim 10, wherein the optical diaphragm elements (11, 21, 31) and the output lenses (4) are configured in such a way that the light patterns (A, B, C) forming a composite light pattern partly overlap each other with some of margins (a, b, c) of the light patterns.

15. The light device according to claim 1, wherein the second diaphragm is the reflective diaphragm (31), and the first diaphragm (21) is situated between the reflective diaphragm (31) and the output lens (4).

* * * * *